United States Patent

Keller et al.

[11] Patent Number: 5,911,911
[45] Date of Patent: Jun. 15, 1999

[54] POLYMERIZED LIQUID-CRYSTALLINE COMPOSITIONS

[75] Inventors: Harald Keller, Ludwigshafen; Karl Siemensmeyer, Frankenthal; Peter Schuhmacher, Mannheim; Manfred Müller, Gelsenkirchen; Rudolf Zentel, Nierstein; Georg Maxein, Neuwied, all of Germany

[73] Assignee: BASF Aktiengesellschaft, Ludwigshafen, Germany

[21] Appl. No.: 08/825,156

[22] Filed: Mar. 26, 1997

[30] Foreign Application Priority Data

Apr. 3, 1996 [DE] Germany .................. 196 13 314.9

[51] Int. Cl.$^6$ .......................... C09K 19/52; C09K 19/32; F21V 9/00
[52] U.S. Cl. ............... 252/299.01; 252/582; 252/299.62
[58] Field of Search .............................. 252/299.01, 582, 252/299.62

[56] References Cited

FOREIGN PATENT DOCUMENTS

| | | |
|---|---|---|
| 2190879 | 11/1995 | Canada . |
| 44 18 076 | 11/1995 | Germany . |
| 96/02597 | 2/1996 | WIPO . |
| WO 96/02597 | 2/1996 | WIPO . |

OTHER PUBLICATIONS

Derek G. Gray; Liquid Crystalline Cellulose Derivatives; Journal of Applied Polymer Science: Applied Polymer Symposium 37, 179–192 (1983).

Y. Nishio, et al.; Morphological Studies of Liquid–Crystalline Cellulose Derivatives. I. Liquid–Crystalline Characteristics of Hydroxypropyl Cellulose in 2–Hydroxyethyl Methacrylate Solutions and in Polymer Composites Prepared by Bulk Polymerization; Journal of Polymer Science: Polymer Physics Edition, vol. 23, 1043–1052 (1985).

Manfred Muller, et al., Advanced Materials, pp. 159–162, Feb. 1997, "Solid Opalescent Films Originating from Urethanes of Cellulose".

Yoshihiko Onogi, Cellulose, pp. 379–384, "Solidified Structure of Cellulose Derivatives from the Liquid Crystalline State", 1990.

S. H. Jiang, et al., J. Macromol. Sci.—Phys., vol. 34, No. 4, pp. 357–367, 1995, "Orientation of Polymer Chains in Oriented (E–CE)C/AA Liquid Crystalline Solutions".

*Primary Examiner*—C. H. Kelly
*Attorney, Agent, or Firm*—Oblon, Spivak, McClelland, Maier & Neustadt, P.C.

[57] ABSTRACT

Polymerized liquid-crystalline compositions are obtainable by radiation curing of mixtures comprising P0 a) one or more cellulose derivatives in which some or all of the hydroxyl groups of the cellulose are replaced by —OR, 13 O—CO—NH—R, —O—CO—R or —O—CO—OR, where each R can be identical or different and is an aliphatic or aromatic radical of up to 20 carbons,
b) one or more polymerizable monomers and
c) if desired, further additives.

2 Claims, No Drawings

POLYMERIZED LIQUID-CRYSTALLINE COMPOSITIONS

The present invention relates to polymerized liquid-crystalline compositions obtainable by radiation-curing of mixtures comprising a) one or more cellulose derivatives in which some or all of the hydroxyl groups of the cellulose are replaced by —OR, —O—CO—NH—R, —O—CO—R or —O—CO—OR, where each R can be identical or different and is an aliphatic or aromatic radical of up to 20 carbons, b) one or more polymerizable monomers and c) if desired, further additives.

The present invention also relates to a method of coating substrates with the liquid-crystalline compositions, to a process for preparing pigments, to coating materials comprising these pigments, to the use of the coating materials for coating vehicle bodies, and to the use of the polymerized liquid-crystalline compositions as coating compositions for commodity articles.

Many cellulose derivatives are known to have the ability, in addition to their solid and liquid aggregate states, to form liquid-crystalline phases as well. Owing to the chirality of the cellulose molecule these liquid-crystalline phases are often cholesteric; in other words, like cholesterol derivatives, the molecules form helical superstructures. Light of a certain wavelength, depending on the pitch of the helix, is selectively reflected by this helical structure. The wavelength and therefore the color of the reflected light depend on the pitch of the helix and on the mean refractive index of the liquid-crystalline mixture. In this instance, the wavelength of the reflected light can be varied from the UV region to values in the IR region.

In addition, various cellulose derivatives in the presence of solvents form cholesteric liquid-crystalline phases, called lyotropic phases (see for example D. G. Gray, J. Appl. Polym. Symp. 37 (1983) 179). Here, the range of the liquid-crystalline state depends on the nature of the derivative, on the temperature, on the concentration and on the nature of the solvent.

In order to utilize the color effects of lyotropic cellulose derivatives in, for example, coating compositions, such as paints, it is advantageous to fix a defined cholesteric order. To achieve such fixing it has been attempted to dissolve cellulose derivatives in a polymerizable solvent (hydroxymethyl methacrylate) to form a lyotropic cholesteric liquid-crystalline phase, and to fix this order structure by means of thermal polymerization (Y. Nishio et al., J. Polym. Sci., Polym. Phys. Ed 23, (1985) 1043).

However, in the course of thermal polymerization nonhomogeneous phases are formed, which have only a weak apparent color.

It is therefore an object of the present invention to provide polymerized liquid-crystalline compositions, comprising cellulose derivatives dissolved in polymerizable solvents, which have a permanent, strong apparent color.

We have found that this object is achieved by the polymerized liquid-crystalline compositions specified at the outset.

Suitable cellulose derivatives are those in which some or all of the hydroxyl groups are replaced by the abovementioned ether, urethane, ester or carbonate groups.

Examples of aliphatic R in these groups are $C_1$–$C_{20}$–alkyl such as methyl, ethyl, n-propyl, isopropyl, n-butyl, isobutyl, sec-butyl, tert-butyl, n-pentyl, isopentyl, sec-pentyl, tert-pentyl, neopentyl, hexyl, heptyl, octyl, 2-ethylhexyl, nonyl, decyl, undecyl, dodecyl, tridecyl, tetradecyl, hexadecyl, octadecyl and eicosyl, in which nonadjacent $CH_2$ groups may be replaced by oxygen, sulfur or ($C_1$–$C_4$)–alkylimino and in which there may also be substitution by, for example, halogen, especially fluorine or chlorine, cyano, nitro or oxo.

Examples of aromatic R are phenyl or naphthyl which may be substituted by abovementioned alkyl, alkoxy, perfluoroalkyl, halogen, such as fluorine, chlorine, bromine or iodine, cyano or nitro.

R is preferably $C_1$–$C_{12}$–alkyl in which up to 4 nonadjacent $CH_2$ groups may be replaced by oxygen, or is phenyl which is unsubstituted or substituted by $C_1$–$C_6$–alkyl, $C_1$–$C_6$–alkoxy, $C_1$–$C_6$–perfluoroalkyl, halogen, cyano or nitro.

In this context both the groups replacing the cellulose hydroxyls and the radicals R can be identical or different at each occurrence.

Particularly preferred polymerized liquid-crystalline compositions are those in which some or all of the cellulose hydroxyls are replaced by identical or different radicals

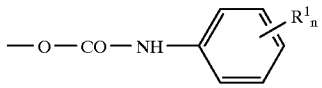

where $R^1$ is chlorine, methyl, ethyl or tert-butyl and n is 0, 1, 2 or 3, preferably 0 or 1. $R^1$ is preferably chlorine and in this case is preferably in the meta position.

The size of the cellulose molecule also affects the liquid-crystalline properties of the lyotropic phases. Cholesteric phases are observed over a broad chain-length range of the cellulose. Preference is given to chain lengths of 5–500, especially 30–200, glucose units.

The mixtures from which it is possible to obtain the novel polymerized liquid-crystalline compositions include one or more polymerizable monomers as solvents for cellulose derivatives. Suitable polymerizable monomers are, in general, all radiation-curable monomers, such as acrylates, methacrylates, vinyl ethers, epoxides, maleic esters, crotonic esters or N-vinylpyrrolidone, or aromatic vinyl monomers, such as styrene, substituted styrenes, cinnamic esters or N-vinylimidazole.

Preferred polymerizable monomers come from the group consisting of acrylates, methacrylates, vinyl ethers, epoxides, maleic esters, crotonic esters and N-vinylpyrrolidone, particular preference being given to acrylates and methacrylates.

Other particularly preferred polymerizable monomers are those containing two or more polymerizable groups. Such monomers polymerize to form three-dimensional networks which are highly stable and make it possible to fix the cholesteric liquid-crystalline order state in a stable and particularly durable manner.

Examples of suitable polymerizable monomers are 2-ethoxyethyl acrylate, diethylene glycol diacrylate, ethylene glycol dimethacrylate, diethylene glycol dimethacrylate, triethylene glycol dimethacrylate, diethylene glycol monomethyl ether acrylate, phenoxyethyl acrylate and tetraethylene glycol dimethacrylate.

The mixtures from which it is possible to obtain the novel polymerized liquid-crystalline compositions also include, if desired, further additives. Examples of suitable additives, especially for photochemically curable mixtures, are photoinitiators. Suitable photoinitiators are all commercially available photoinitiators, such as isobutyl benzoin ether, 2,4,6-trimethylbenzoyldiphenyl-phosphine oxide, 1-hydroxycyclohexyl phenyl ketone, 2-benzyl-2-methylamino-1-(4-morpholinophenyl)furan-1-one, mixtures of benzophenone and 1-hydroxycyclohexyl phenyl ketone, 2,2-dimethoxy-2-phenylacetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)-phenyl 2-hydroxy-2-propyl ketone, 2,2-diethoxyacetophenone, 4-benzoyl-4'-methyldiphenyl sulfide, ethyl-4-(dimethylamino)benzoate, mixtures of 2-isopropylthioxanthone and 4-isopropylthioxanthone, 2-(dimethylamino)ethyl benzoate, d,1-camphorquinone, ethyl-d,1-camphorquinone, mixtures of benzophenone and 4-methyl-benzophenone, benzophenone, 4,4'-bisdimethylaminobenzophenone, ($\eta^5$-cyclopentadienyl)($\eta^6$-isopropylphenyl)iron(II) hexafluorophosphate, triphenylsulfonium hexafluorophosphate, or mixtures of triphenylsulfonium salts.

Examples of other components suitable as further additives are nonpolymerizable solvents, dyes, pigments, especially black pigments, polymeric binders, leveling auxiliaries and dispersants.

The proportions by weight of the cellulose derivatives, of the polymerizable monomers and of the further additives present if desired can vary within ranges depending on the chemical structure of the derivatives and of the polymerizable monomer. In general, the proportion of cellulose derivatives in the overall quantity of mixture (=100% by weight) is from 10 to 90% by weight, preferably between 20 and 50% by weight. The proportion of polymerizable monomers is in general from 10 to 90% by weight, preferably from 50 to 80% by weight. The concentration of the further additives depends on the nature of the additive and is within the ranges of concentration which are customarily used in the art.

An appropriate method of coating substrates using these mixtures comprises applying such a mixture to a substrate and polymerizing it by means of light or electron beams.

Examples of suitable substrates are glass, metal, plastic, wood and paper, and, for example, films. Application can be made by various techniques, such as spreading, spraying, dipping, printing, rolling or pouring, for example through a casting gap. In general, the cholesteric order state is established spontaneously. In some cases the action of additional forces, for instance by knife coating or the application of electrical or magnetic fields, is advantageous. Coating is carried out with advantage in thin films, for example 5–100 μm. Particularly bright colors are obtained if coating is carried out on a dark ground. Following the application and, if practiced, orientation of the liquid-crystalline mixture, radiation curing takes place.

From the novel polymers of liquid-crystalline compositions it is also possible to produce colored pigments, for example by applying one of the abovementioned mixtures to a substrate, polymerizing it by means of light or electron beams, detaching the layer from the substrate and comminuting it to form pigment particles. In this case the substrate used is advantageously a film or the surface of a roller. The layer thickness is advantageously from 2 to 100 μm, particularly preferably from 5 to 10 μm. Comminution of the detached layer is generally carried out by grinding in a manner known to the expert until a particle size is reached at which the mean diameter is greater than the layer thickness, so that plateletlike pigment particles are formed. When used in coating materials, for example, these plateletlike pigments lie on the surface of the substrates, so as to form a preferential direction of the orientation as in accordance with the original coating, thereby achieving the desired color effect.

The novel polymerized compositions can be used advantageously as coating material for commodity articles. The coating of vehicles, such as autos and bicycles, of packaging and labels and of jewelry articles is particularly effective.

In this context, coating can be carried out directly or by way of paints which include pigments produced in accordance with the invention. Especially when painting substrates with large surface areas, such as vehicle bodies, the use of paints containing pigments produced according to the invention is advantageous.

The invention has numerous advantages: through radiation curing it is possible to establish and fix a shade independent of the temperature. Curing takes place with sufficient rapidity for no separation or phase changes to occur in the course of the curing process. In the case of curing by means of electron beams it is possible to omit entirely the addition of polymerization initiators. By masking off regions of the surface it is possible to obtain fine texturing of the colored regions. Since the color of selective reflection depends, inter alia, on the temperature during crosslinking, the color can be varied without altering the composition of the polymerizable mixture. For example, it is possible by masking off to expose only certain regions of a surface at one temperature, and to crosslink them, and then to cure other regions at a different temperature. In this way it is even possible to produce color patterns. The polymerized compositions exhibit bright colors, where the color perceived is dependent on the viewing angle.

EXAMPLE 1 a) Preparation of cellulose carbanilide 20 g of cellulose propionate (average molecular weight about 15,000 g/mol) were dissolved in 125 ml of water and 25 g of sodium hydroxide and the solution was stirred at 0° for 2.5 hours. It was then neutralized with hydrochloric acid, and the cellulose was filtered off, washed with water and dried by azeotropic distillation with toluene. The residual toluene was removed by vacuum distillation.

The cellulose was suspended in 210 ml of pyridine with exclusion of water. 50 ml of phenyl isocyanate were added dropwise at 80° C. over the course of 5 minutes, and the mixture was then stirred at the same temperature for 48 hours. Then the solvent was removed by distillation and the product was precipitated by adding 1 l of methanol, taken up in 600 ml of acetone and then precipitated again by adding 1 l of methanol.

Yield: 21.0 g

IR spectrum: 3400 cm$^{-1}$ (NH)
3300 cm$^{-1}$ (NH)
1730 cm$^{-1}$ (C=O)
1600 cm$^{-1}$ (C=C)
1530 cm$^{-1}$ (C=C)

b) Preparation of a film showing selective reflection

A mixture of 2.80 g of cellulose carbanilide, 4.00 g of diethylene glycol dimethacrylate and 60 mg of the photoinitiator 2,4,6-trimethylbenzoyldiphenylphosphine oxide was stirred for 24 hours. 2 g of the mixture was applied to a glass plate and covered over with a second glass plate. After 48 hours, the layer was exposed using a UV-A lamp. The polymerized filmlike layer was removed from the glass plate. The transparent film showed selective reflection with a wavelength maximum of 610 nm. When looked at straight on the film appeared red, while with lateral viewing it took on a green color.

EXAMPLE 2

Preparation of a mixed cellulose urethane

In a manner similar to Example 1, 16.7 g of cellulose acetate (average molecular weight about 29,000 g/mol) were hydrolyzed to cellulose. The cellulose was then reacted with a mixture of 35 ml of phenyl isocyanate and 15 ml of 3-chlorophenyl isocyanate and was worked up as described. Yield: 21.3 g IR spectrum: characteristic bands as in Example 1

Preparation of films showing selective reflection

EXAMPLE 3

In a manner similar to Example 1, a film was produced from 3.20 g of the mixed cellulose urethane of Example 2 and 3.99 g of 2-ethoxyethyl acrylate and also 60 mg of the photoinitiator. Selective reflection took place at 620 nm. The color flop was like that of Example 1.

EXAMPLE 4

In a manner similar to Example 1, a film was produced from 3.00 g of the mixed cellulose urethane of Example 2 and 3.34 g of 2-ethoxyethyl acrylate and also 45 mg of the photoinitiator. Selective reflection took place at 515 nm. The film appeared green when looked at straight on, and blue when looked at from the side.

EXAMPLE 5

In a manner similar to Example 1, a film was produced from 3.23 g of the mixed cellulose urethane of Example 2 and 4.00 g of diethylene glycol diacrylate and also 66 mg of the photoinitiator. Selective reflection took place at 630 nm. The film appeared red when looked at straight on, and blue when looked at from the side.

EXAMPLE 6 a) In a manner similar to Example 1, a film was produced from 2.01 g of the mixed cellulose urethane of Example 2 and 1.50 g of diethylene glycol diacrylate and 1.02 g of triethylene glycol dimethacrylate and also 43 mg of the photoinitiator. Selective reflection took place at 470 nm. The film appeared blue when looked at straight on, and colorless when looked at from the side.

b) A mixture of 1 g of the mixed cellulose urethane of Example 2, 0.5 g of phenoxyethyl acrylate, 2.5 g of acetone and 16 mg of the photoinitiator was applied to a black-primed metal panel using a box-type doctor knife with a 400 µm blade gap. After evaporation of the acetone, a reddish film was obtained.

EXAMPLE 7

2.0 g of the cellulose from Example 2 were suspended in 50 ml of pyridine and this suspension was reacted in a manner similar to Example 1 with a mixture of 7 ml of phenyl isocyanate and 3 ml of 3-chlorophenyl isocyanate. Working up took place as described. In a manner similar to Example 1, 160 mg of the mixed cellulose urethane, 200 mg of diethylene glycol dimethacrylate and 4 mg of the photoinitiator were mixed and aliquots of the mixture were placed between two cover glasses. The cover glasses were heat-conditioned for 3 hours each and then irradiated with UV light. The resulting films showed different selective reflections depending on the curing temperature:

| Reaction temperature | Absorption maximum | Color |
| --- | --- | --- |
| 40° C. | 430 nm | blue |
| 50° C. | 470 nm | turquoise |
| 60° C. | 515 nm | turquoise |
| 75° C. | 570 nm | green |

EXAMPLE 8

In a manner similar to Example 2, cellulose was reacted with different mixtures of phenyl isocyanate and 3-chlorophenyl isocyanate. 4.5 g portions of the products were reacted with 5.5 g of tetraethylene glycol dimethacrylate and cured at different temperatures in analogy to Example 7. The resulting films showed different selective reflections.

| Molar ratio phenyl isocyanate/chloro-phenyl isocyanate | Reaction temperature | Absorption maximum | Color |
| --- | --- | --- | --- |
| 0/100 | 60° C. | <400 nm | violet |
| 70/30 | 20° C. | 405 nm | blue |
| 70/30 | 60° C. | 585 nm | red-brown |
| 80/20 | 20° C. | 750 nm | red |

EXAMPLE 9

Preparation of cellulose-3-chlorophenylurethane 18 g of cellulose that had been prepared from cellulose acetate in a manner similar to that of Example 2 were suspended in 360 g of pyridine with exclusion of water. 133 g of 3-chlorophenyl isocyanate were added dropwise over the course 5 minutes at 90° C., and then the mixture was stirred at the same temperature for 138 hours. The solution was filtered and concentrated to 200 ml on a rotary evaporator. The product was then precipitated in 2 l of a mixture of 95 parts methanol and 5 parts water.

Yield: 48 g

EXAMPLE 10

Preparation of cellulose-(3-trifluoromethyl) phenylurethane

In a manner similar to that of Example 1, 33.4 g of cellulose acetate (mean molecular weight about 29,000 g/mol) were hydrolyzed to cellulose. 5.0 g of the resulting cellulose were suspended in 150 ml of dry pyridine and the suspension was heated to 80° C. Then 27 g of 3-(trifluoromethy)phenyl isocyanate were added and the mixture was stirred at 80° C. for 2 days with exclusion of atmospheric humidity. The reaction mixture was precipitated in a mixture of 500 ml of methanol and 250 ml of water. The precipitate was isolated by filtration and dissolved in 200 ml of acetone and the solution was centrifuged. The solution was then precipitated in 400 ml of water, and the precipitate was isolated by filtration and dried.

Yield: 19.4 g

IR spectrum: 3400 cm$^{-1}$ (N—H)
1720 cm$^{-1}$ (C=O)

1600 cm$^{-1}$ (C═C arom.)
1550 cm$^{-1}$ (C═C arom.)

EXAMPLE 11

Molecular weight degradation of cellulose-(3-trifluoromethyl)-phenylurethane 15 g of cellulose-(3-trifluoromethyl)phenylurethane, prepared in accordance with Example 10, were dissolved in 110 ml of ethylene glycol monomethyl ether. The solution was heated to 100° C. while passing argon into it. Then a solution of 3.5 g of p-toluenesulfonic acid monohydrate in 10 ml of ethylene glycol monomethyl ether was added, and the homogeneous solution was stirred at 100° C. under argon. 20 ml samples of the reaction solution were removed after 1, 2, 3, 4 and 6 h and each sample was precipitated in 50 ml of water. After 8 h, the remainder of the reaction solution was precipitated in 60 ml of water. The individual fractions were filtered and dried. Comparison of the IR spectra of the cellulose-(3-trifluoromethyl)phenylurethane from Example 10 with that of the product degraded for 8 h showed no loss of the 3-tri-fluoromethyl-phenylurethane side chains.

| Fraction | Degradation time [h] | Yield [g] |
| --- | --- | --- |
| 0 | 0 | |
| 1 | 1 | 2.08 |
| 2 | 2 | 2.05 |
| 3 | 3 | 2.03 |
| 4 | 4 | 2.03 |
| 5 | 6 | 2.13 |
| 6 | 8 | 3.52 |

EXAMPLE 12

Preparation of layers showing selective reflection

Cellulose-(3-trifluoromethyl)phenylurethane, diethylene glycol dimethacrylate and the photoinitiator 2,4,6-trimethylbenzoyl-diphenylphosphine oxide were used to prepare, in analogy to Example 1, films showing selective reflection. In this preparation, 10 mg of photoinitiator were used per gram of the mixture of cellulose-(3-trifluoromethyl)phenylurethane and diethylene glycol dimethacrylate. The table below shows the proportions used in the mixtures of cellulose-(3-trifluoromethyl) phenylurethane—referred to below as CTPU—and diethylene glycol dimethacrylate —referred to below as DEDM - and also the selective reflection and color of the layers produced.

| Polymer | Percent by weight of CTPU in the mixture with DEDM | Reflection maximum [nm] | Color |
| --- | --- | --- | --- |
| CTPU from Example 10 | 41 | 683 | red |
| CTPU from Example 10 | 45 | 595 | reddish gold |
| CTPU from Example 10 | 46 | 592 | reddish gold |
| CTPU from Example 11 Fraction 1 | 44 | 607 | reddish gold |
| CTPU from Example 11 Fraction 2 | 45 | 522 | green |
| CTPU from Example 11 Fraction 2 | 44 | 570 | greenish gold |
| CTPU from Example 11 Fraction 3 | 45 | 494 | turquoise |
| CTPU from Example 11 Fraction 3 | 44 | 548 | greenish gold |
| CTPU from Example 11 Fraction 4 | 44 | 492 | turquoise |
| CTPU from Example 11 Fraction 5 | 44 | 497 | turquoise |

EXAMPLE 13

Preparation of layers showing selective reflection, with cellulose-(3-trifluoromethyl)phenylurethane Mixtures were prepared from cellulose-(3-trifluoromethyl)phenylurethane, dipropylene glycol diacrylate and the photoinitiator 2,4,6-trimethylbenzoyldiphenylphosphine oxide. In this preparation, 10 mg of photoinitiator were used per gram of the mixture of cellulose-(3-trifluoromethyl)phenylurethane and dipropylene glycol diacrylate. The mixtures were applied to glass plates using a motorized doctor knife, at a rate of advance of 0.5 cm/s and with a blade gap of 100 µm. The layers were then cured under nitrogen by irradiation with a UVA lamp. The table below shows the proportions used in the mixtures of cellulose-(3-trifluoro-methyl) phenylurethane —referred to below as CTPU—and dipropylene glycol diacrylate—referred to below as DPDA—and also the selective reflection and color of the layers produced.

| Polymer | Percent by weight of CTPU in the mixture with DPDA | Reflexion maximum [nm] | Color |
| --- | --- | --- | --- |
| CTPU from Example 10 | 41 | 603 | red |
| CTPU from Example 10 | 44 | 603 | red |
| CTPU from Example 10 | 47 | 552 | green |
| CTPU from Example 11 Fraction 1 | 44 | 597 | red |
| CTPU from Example 11 Fraction 3 | 44 | 563 | green |
| CTPU from Example 11 Fraction 4 | 44 | not determined | reddish brown |

We claim:

1. A polymerized liquid-crystalline composition obtained by radiation curing a mixture comprising
   a) one or more cellulose compounds in which some or all cellulose hydroxyl groups are replaced by
      (1) —OR, —O—CO—NH—R, —O—CO—R or —O—CO—OR, where each R can be identical or different and is naphthyl which is unsubstituted or substituted by $C_1$–$C_6$–alkyl, $C_1$–$C_6$–alkoxy, $C_1$–$C_6$–perfluoroalkyl, halogen, cyano or nitro; or
      (2) —O—CO—NH—R, where each R can be identical or different and is an aliphatic or aromatic radical of up to 20 carbons selected from the group of aliphatic radicals consisting, of methyl, ethyl, n-propyl, isopropyl, n-butyl, isobutyl, sec-butyl, tert-butyl, n-pentyl, isopentyl, sec-pentyl, tert-pentyl, neopentyl, hexyl, heptyl, octyl, 2-ethylhexyl, nonyl, decyl, undecyl, dodecyl, tridecyl, tetradecyl, hexadecyl, octadecyl and eicosyl, in which nonadjacent CH$_2$ groups may be replaced by sulfur or (C$_1$–C$_4$)-alkylimino and which may be substituted by halogen, cyano, nitro or oxo, and the group of aromatic radicals consisting, of phlenyl, wherein phenyl may be substituted with alkyl, alkoxy, perfluoroalkyl, halogen, cyano or nitro groups; and b) one or nore polymerizable monomer.

2. A composition as claimed in claim 1 where all or some of the cellulose hydroxyls are replaced by identical or different radicals of the formula

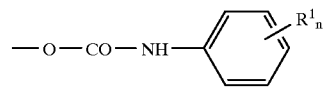

where R$^1$ is chlorine, methyl, ethyl or tert-butyl and n is 0, 1, 2 or 3.

* * * * *